(12) United States Patent
Kim

(10) Patent No.: US 12,141,057 B2
(45) Date of Patent: Nov. 12, 2024

(54) CONTROLLER AND METHOD OF CALCULATING BLOCK STRESS INDEX BASED ON NUMBER OF PLANES

(71) Applicant: SK hynix Inc., Icheon-si (KR)

(72) Inventor: Jong Wook Kim, Icheon-si (KR)

(73) Assignee: SK hynix Inc., Icheon-si (KR)

( * ) Notice: Subject to any disclaimer, the term of this patent is extended or adjusted under 35 U.S.C. 154(b) by 30 days.

(21) Appl. No.: 18/076,798

(22) Filed: Dec. 7, 2022

(65) Prior Publication Data

US 2024/0020015 A1   Jan. 18, 2024

(30) Foreign Application Priority Data

Jul. 18, 2022   (KR) .................. 10-2022-0088350

(51) Int. Cl.
*G06F 12/02*   (2006.01)
(52) U.S. Cl.
CPC .. *G06F 12/0246* (2013.01); *G06F 2212/7205* (2013.01); *G06F 2212/7211* (2013.01)
(58) Field of Classification Search
CPC ......... G06F 12/0246; G06F 2212/7205; G06F 2212/7211
See application file for complete search history.

(56) References Cited

U.S. PATENT DOCUMENTS

| | | | | |
|---|---|---|---|---|
| 8,898,373 B1 * | 11/2014 | Kang | ................. | G06F 12/0246 |
| | | | | 711/E12.008 |
| 2018/0157586 A1 * | 6/2018 | Yi | ...................... | G06F 12/0246 |

FOREIGN PATENT DOCUMENTS

| KR | 1020160112529 A | 9/2016 |
|---|---|---|
| KR | 1020180039351 A | 4/2018 |

* cited by examiner

*Primary Examiner* — Chie Yew
(74) *Attorney, Agent, or Firm* — WILLIAM PARK & ASSOCIATES LTD.

(57) ABSTRACT

The present technology includes a controller and a method of operating the same. The controller includes a stress manager configured to generate a conversion value according to a number of selected planes during an erase operation and configured to calculate a stress index of a memory block based on the conversion value, a register configured to store the stress index corresponding to the memory block, and a garbage collection manager configured to compare the stress index to a garbage collection reference value to output a garbage collection control signal.

29 Claims, 12 Drawing Sheets

CONTROLLER AND METHOD OF CALCULATING BLOCK STRESS INDEX BASED ON NUMBER OF PLANES

CROSS-REFERENCE TO RELATED APPLICATION

The present application claims priority under 35 U.S.C. § 119(a) to Korean patent application number 10-2022-0088350, filed on Jul. 18, 2022, in the Korean Intellectual Property Office, the entire disclosure of which is incorporated herein by reference.

BACKGROUND

1. Technical Field

The present disclosure relates to a controller and a method of operating the same, and more particularly, to a controller and a method of operating the same of a memory system capable of performing a program or erase operation.

2. Related Art

A memory system may include a memory device configured to store data, and a controller configured to control the memory device.

The memory device may include a memory cell array in which data is stored, a peripheral circuit configured to program data into the memory cell array, read data from the memory cell array, or erase data in the memory cell array, and a control circuit configured to control the peripheral circuit.

The memory cell array may include a plurality of planes. Each of the plurality of planes may include a plurality of memory blocks, and each of the plurality of memory blocks may include a plurality of memory cells.

The peripheral circuit may be configured to perform a program, read, or erase operation on a memory block that is selected from among the memory blocks that are included in the memory device according to the control of the control circuit.

The control circuit may be configured to control the peripheral circuit in response to a command and an address that is output from the controller. For example, the control circuit may control the peripheral circuit to perform the program operation on the selected memory block in response to a program command and the address, control the peripheral circuit to perform the read operation on the selected memory block in response to a read command and the address, or control the peripheral circuit to erase the selected memory block in response to an erase command and the address.

In a normal mode, the controller may control the memory device according to a request of a host, and in a background mode, the controller may manage the memory device even though the request of the host does not exist. For example, in the background mode, the controller may perform garbage collection or wear leveling. The garbage collection may be performed to increase the number of free memory blocks when the number of free memory blocks that are included in the memory device is less than a threshold number. The wear leveling may be performed to prevent an increase of the number of times the program and erase operations are performed on specific memory blocks.

In order to shorten an operation time of the memory device, operations may be simultaneously performed in a plurality of memory blocks that are included in a plurality of planes. For example, when the erase operation on the selected memory block is performed on each of the plurality of planes, a loading time of operation voltages may increase compared to a case in which the erase operation on the selected memory block is performed on one plane. Therefore, as the number of selected memory blocks increases, a speed of the erase operation may become decreased. In other words, as the number of memory blocks on which the erase operation is simultaneously performed increases, a stress applied to the memory blocks may be lower than a case in which the erase operation is simultaneously performed on a relatively less number of memory blocks. The stress applied to the memory block occurs in various portions of the memory block, but in general, the stress refers to a stress applied to a silicon crystal in a channel area. For example, when the silicon crystal formed in the channel area receives the stress, mobility of an electron or a hole shared by the silicon crystal may vary, and thus a current flowing through the channel may vary. That is, an amount of current flowing through the channel may vary due to the stress. When the amount of current flowing through the channel varies, since a threshold voltage of the memory cells may not be accurately sensed during a verify or read operation, reliability of the memory device may be deteriorated.

SUMMARY

According to an embodiment of the present disclosure, a controller includes a stress manager configured to generate a conversion value according to a number of selected planes during an erase operation and configured to calculate a stress index of a memory block based on the conversion value, a register configured to store the stress index corresponding to the memory block, and a garbage collection manager configured to compare the stress index to a garbage collection reference value to output a garbage collection control signal.

According to an embodiment of the present disclosure, a controller includes a central processing unit configured to generate an erase command in response to an erase request that is output from a host, an internal memory configured to store a logical address that is output from the host and a physical address that is mapped to the logical address, and a background manager configured to calculate a stress index of a memory block on which an erase operation is performed according to a plane address that is included in the physical address and configured to output a background control signal that activates a background mode according to the stress index.

According to an embodiment of the present disclosure, a method of operating a controller includes counting the number of planes of selected planes during an erase operation, setting an offset according to the number of planes, generating a conversion value by performing an operation that subtracts the offset from an operation reference value, calculating a stress index of the selected memory block by adding the conversion value to an accumulated stress index of a selected memory block, among memory blocks that are included in each of the selected planes, comparing the stress index with a background reference value, and activating a background mode when the stress index is equal to or greater than the background reference value.

DETAILED DESCRIPTION

Specific structural or functional descriptions disclosed below are exemplified to describe embodiments according to the concept of the present disclosure. The embodiment according to the concept of the present disclosure is not construed as being limited to the embodiments described below, and may be variously modified and replaced with other equivalent embodiments.

Hereinafter, terms such as first and second may be used to describe various components, but the components are not limited by the terms. The terms are used for the purpose of distinguishing one component from another component.

An embodiment of the present disclosure provides a controller and a method of operating the same capable of reducing a stress of a memory device and improving efficiency of a background mode.

According to the present technology, a stress of the memory device that is included in a memory system may be reduced, and the background mode may be efficiently performed according to a state of the memory device.

Figure 1:
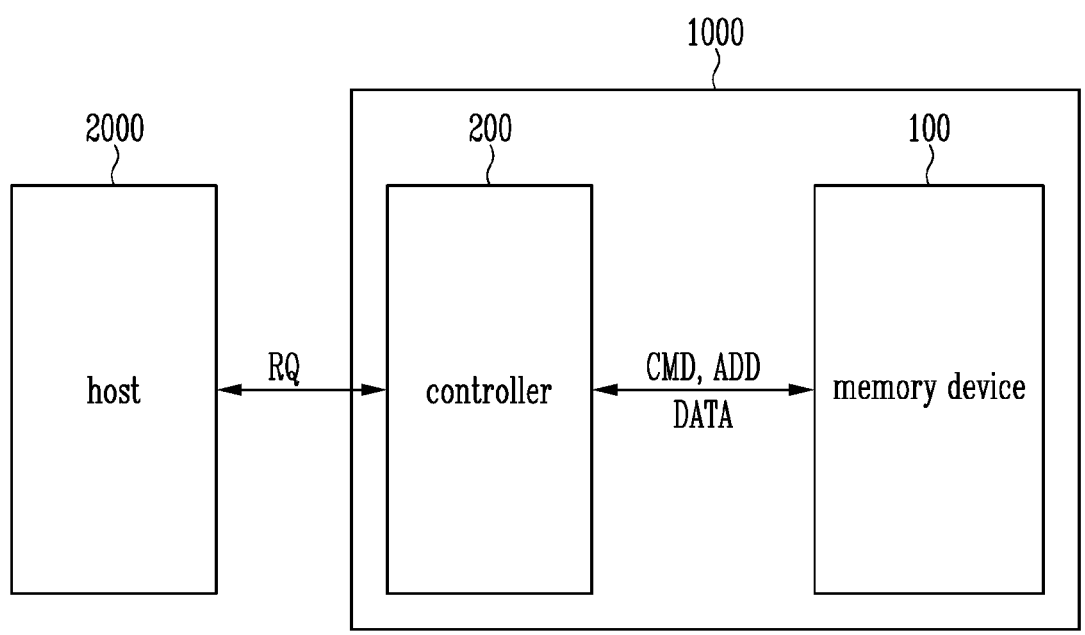
FIG. 1 is a diagram illustrating a memory system.

FIG. 1 is a diagram illustrating a memory system.

Referring to FIG. 1, the memory system 1000 may be configured to program, erase, or read data in response to a request of a host 2000. For example, the memory system 1000 may include a memory device 100 capable of storing data, and a controller 200 configured to control the memory device 100. Although the memory system 1000 including one memory device 100 is shown in FIG. 1, two or more memory devices may be included in the memory system 1000. In the present embodiment, the memory device 100 may be configured as a non-volatile memory device.

When the controller 200 receives a request RQ that is output from the host 2000, the controller 200 may generate a command CMD that controls the memory device 100 according to the received request RQ. The host 2000 may output a logical address, and the controller 200 may select a physical address that is mapped to the received logical address. Therefore, the controller 200 may transmit the command CMD and an address ADD corresponding to the request RQ to the memory device 100. The address ADD that is transmitted from the controller 200 to the memory device 100 may be the physical address.

For example, during a program operation, the host 2000 may output a request RQ corresponding to the program operation, the logical address, and data to the memory system 1000. The controller 200, included in the memory system 1000, may select the physical address corresponding to the received logical address and may map the physical address to the logical address. The controller 200 may generate a command CMD corresponding to the program operation according to the received request RQ. The controller 200 may transmit the command CMD, the address ADD, and data DATA to the memory device 100. The address ADD that is transmitted to the memory device 100 may be the physical address that is mapped to the logical address.

For example, during an erase operation, the host 2000 may output a request RQ corresponding to the erase operation and the logical address to the memory system 1000. The controller 200, included in the memory system 1000, may select the physical address that is mapped to the received logical address and may generate a command CMD corresponding to the erase operation. The controller 200 may transmit the command CMD and the address ADD to the memory device 100.

For example, during a read operation, the host 2000 may output a request RQ corresponding to the read operation and a logical address to the memory system 1000. The controller 200, included in the memory system 1000, may select the physical address that is mapped to the received logical address and generate a command CMD corresponding to the read operation. The controller 200 may transmit the command CMD and the address ADD to the memory device 100. Subsequently, when the memory device 100 outputs read data DATA, the controller 200 may output the data to the host 2000.

An operation that is performed in the memory system 1000 in response to the request RQ of the host 2000 may be performed in a normal mode. An operation that is performed in the memory system 1000 without the request RQ of the host 2000 may be performed in a background mode. For example, in the background mode, the controller 200 may perform garbage collection or wear leveling. The garbage collection may be performed to increase the number of free memory blocks in which data may be stored. The wear leveling may be performed to prevent an increase in the number of times the program and erase operations are performed on a specific memory block during the program operation.

In the present embodiment, the controller 200 may be configured to perform the garbage collection or the wear leveling according to a stress index of memory blocks that are included in the memory device 100.

Figure 2:
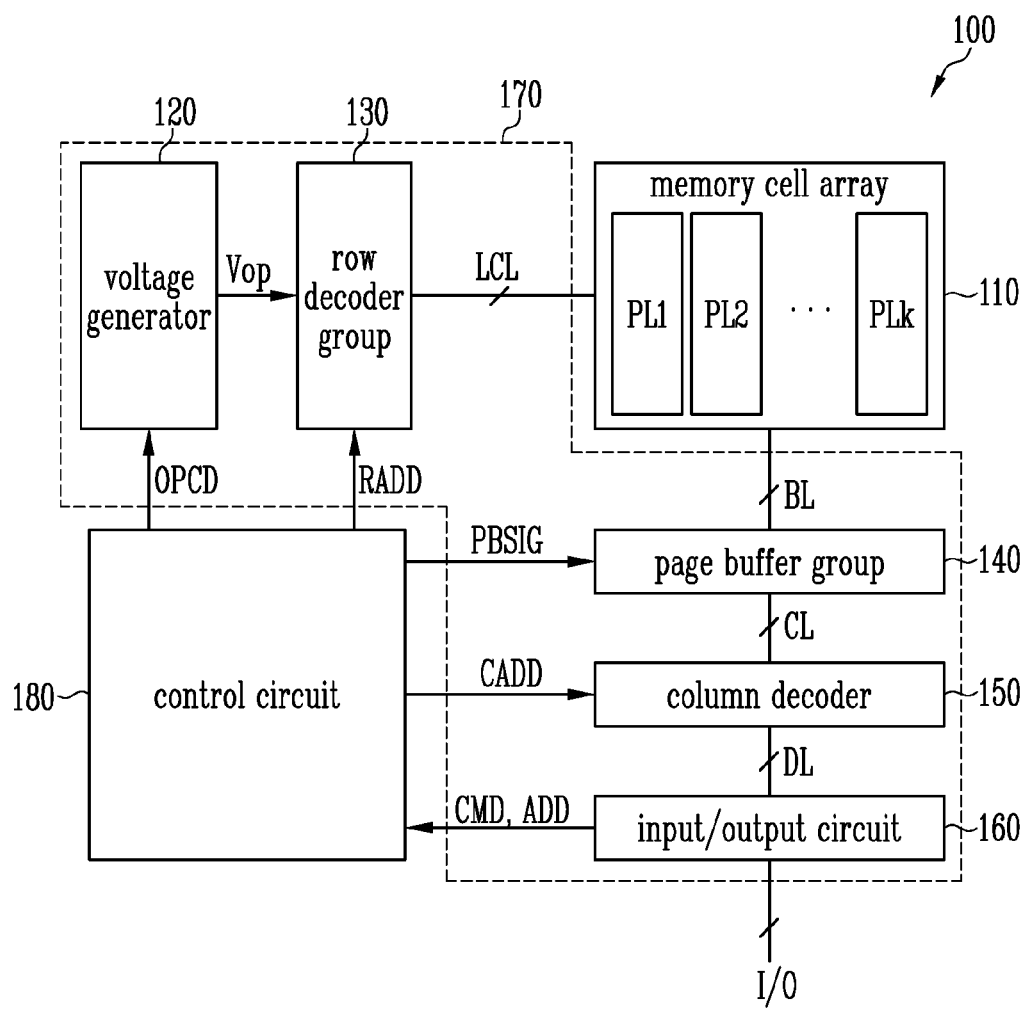
FIG. 2 is a diagram illustrating a memory device.

FIG. 2 is a diagram illustrating the memory device.

Referring to FIG. 2, the memory device 100 may include a memory cell array 110, a peripheral circuit 170, and a control circuit 180.

The memory cell array 110 may include at least one plane. For example, the memory cell array 110 may have a multi-plane structure including first to k-th planes PL1 to PLk. Each of the first to k-th planes PL1 to PLk may include memory blocks, and each of the memory blocks may include memory cells. The memory blocks may be formed in a two-dimensional structure or a three-dimensional structure. The memory blocks having the two-dimensional structure may include memory cells that are arranged to be parallel to a substrate. The memory blocks having the three-dimensional structure may include memory cells that are stacked on a substrate in a vertical direction. In the present embodiment, the memory blocks that are formed in the three-dimensional structure are described for convenience of description, but the present embodiment may also be applied to the memory blocks having a two-dimensional structure.

The memory cells may store one bit or two or more bits of data according to a program method. For example, a method in which one bit of data is stored in one memory cell is referred to as a single level cell method, and a method in which two bits of data is stored is referred to as a multi-level cell method. A method in which three bits of data is stored in one memory cell is referred to as a triple level cell method, and a method in which four bits of data is stored is referred to as a quad level cell method. In addition, five or more bits of data may be stored in one memory cell.

The peripheral circuit 170 may be configured to perform a program operation that stores data in the memory cell array 110, a read operation that outputs data that is stored in the memory cell array 110, and an erase operation for erasing data that is stored in the memory cell array. For example, the peripheral circuit 170 may include a voltage generator 120, a row decoder group 130, a page buffer group 140, a column decoder 150, and an input/output circuit 160.

The voltage generator 120 may generate various operation voltages Vop that are used for the program operation, the read operation, or the erase operation in response to an operation code OPCD. For example, the voltage generator 120 may be configured to generate a program voltage, a pass voltage, a turn-on voltage, a turn-off voltage, a ground voltage, a verify voltage, a read voltage, an erase voltage, or the like in response to the operation code OPCD. The program voltage may be a voltage that is applied to a selected word line during the program operation and may be used to increase a threshold voltage of the memory cells. The pass voltage may be a voltage that is applied to unselected word lines during the program or read operation and may be used to turn on unselected memory cells. The turn-on voltage may be a voltage that is applied to a drain selection line or a source selection line and may be used to turn on a drain selection transistor or a source selection transistor. The turn-off voltage may be a voltage that is applied to the drain selection line or the source selection line and may be used to turn off the drain selection transistor or the source selection transistor. The ground voltage may be a 0V voltage. The verify voltage may be a voltage that determines a threshold voltage of selected memory cells during the program or erase operation and may be applied to the selected word line or all word lines that are connected to the selected memory block. The read voltage may be a voltage that is applied to the selected word line during the read operation and may be used to determine data that is stored in the memory cells. The erase voltage may be a voltage that is applied to the source line during the erase operation and may be used to lower the threshold voltage of the memory cells.

The row decoder group 130 may be configured to transmit the operation voltages Vop to local lines LCL that are connected to the selected memory block according to a row address RADD. For example, the row decoder group 130 may be connected to the voltage generator 120 through global lines and may be connected to the first to k-th planes PL1 to PLk through the local lines LCL. The row decoder group 130 may include row decoders (not shown) that are respectively connected to the first to k-th planes PL1 to PLk. Each of the row decoders (not shown) may be connected to memory blocks that are included in the first to k-th planes PL1 to PLk through the local lines LCL. The local lines LCL may include at least one drain selection line, at least one word line, at least one source selection line, and at least one source line.

The page buffer group 140 may include page buffers (not shown) that are respectively connected to the first to k-th planes PL1 to PLk. Each of the page buffers (not shown) may be connected to the memory blocks that are included in the first to k-th planes PL1 to PLk through bit lines BL. The page buffers (not shown) may adjust a level of a voltage that is applied to the bit lines BL and a time at which the voltage is applied to the bit lines BL in response to a page buffer control signals PBSIG and may store data that is read from the memory cells by sensing a current or a voltage of the bit lines BL.

The column decoder 150 may be configured to transmit data between the page buffer group 140 and the input/output circuit 160 in response to a column address CADD. For example, the column decoder 150 may be connected to the page buffer group 140 through column lines CL and may be connected to the input/output circuit 160 through data lines DL.

The input/output circuit 160 may be configured to receive or output the command CMD, the address ADD, or data through input/output lines I/O. For example, the input/output circuit 160 may transmit the command CMD and the address ADD that are received through the input/output lines I/O to the control circuit 180 and may transmit data that is received through the input/output lines I/O to the column decoder 150. Alternatively, the input/output circuit 160 may output data that is received from the column decoder 150 to the controller 200 of FIG. 1 through the input/output lines I/O.

The control circuit 180 may output the operation code OPCD, the row address RADD, the page buffer control signals PBSIG, and the column address CADD in response to the command CMD and the address ADD. For example, when the command CMD that is input to the control circuit 180 is the command corresponding to the erase operation, the control circuit 180 may control the peripheral circuit 170 to perform the erase operation on the memory block that is selected by the address ADD. When the command CMD that is input to the control circuit 180 is the command corresponding to the read operation, the control circuit 180 may control the peripheral circuit 170 to perform the read operation on the memory block that is selected by the address and may output the read data. When the command CMD that is input to the control circuit 180 is the command corresponding to the program operation, the control circuit 180 may control the peripheral circuit 170 to perform the program operation on the selected memory block.

Figure 3:
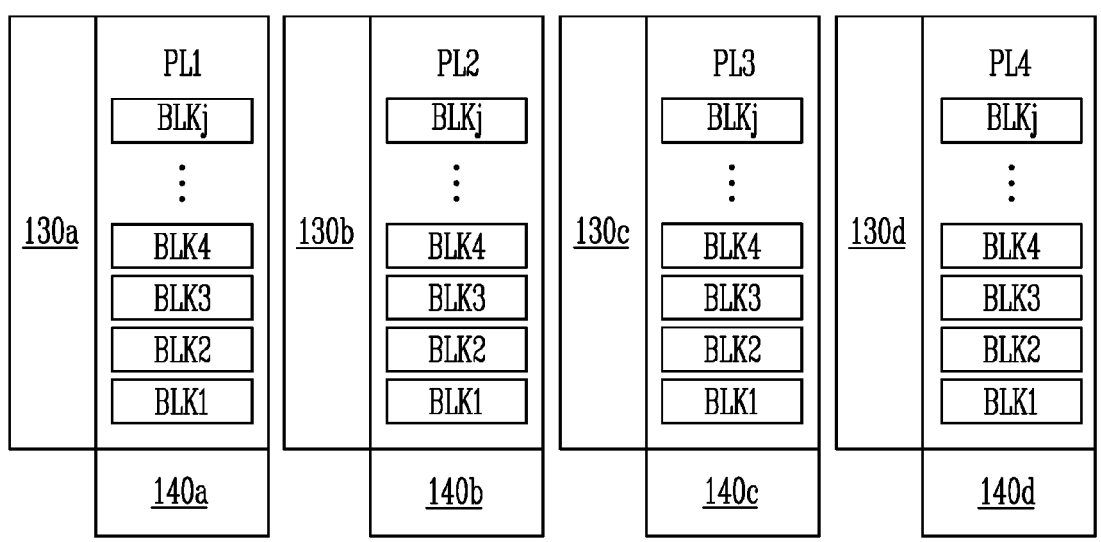
FIG. 3 is a diagram illustrating a multi-plane structure.

FIG. 3 is a diagram illustrating the multi-plane structure.

Referring to FIG. 3, when the memory cell array 110 of FIG. 2 is configured in the multi-plane structure, the row decoder group 130 of FIG. 2 and the page buffer group 140 of FIG. 2 may include row decoders and page buffers that are respectively connected to the planes that are included in the memory cell array 110. For example, when first to fourth planes PL1 to PL4 are included in the memory cell array 110, the row decoder group 130 may include first to fourth row decoders 130a to 130d that are connected to the first to fourth planes PL1 to PL4, and the page buffer group 140 may include first to fourth page buffers 140a to 140d that are connected to the first to fourth planes PL1 to PL4. The first row decoder 130a and the first page buffer 140a may be connected to the first plane PL1, the second row decoder 130b and the second page buffer 140b may be connected to the second plane PL2, the third row decoder 130c and the third page buffer 140c may be connected to the third plane PL3, and the fourth row decoder 130d and the fourth page buffer 140d may be connected to the fourth plane PL4.

Therefore, the first row decoder 130a may select one memory block from among first to j-th memory blocks BLK1 to BLKj that are included in the first plane PL1, and the first page buffer 140a may transmit/receive data through bit lines that are connected to the selected memory block. For example, the operation voltages may be applied through the local lines that are connected to the memory block that is selected in the first plane PL1, and local lines of unselected memory blocks, other than the selected memory block among the first to j-th memory blocks BLK1 to BLKj that are included in the first plane PL1, may be floated.

The first to j-th memory blocks BLK1 to BLKj that are included in each of the remaining second to fourth planes PL2 to PL4 may also be selected or unselected by the second to fourth row decoders 130b to 130d and the second to fourth page buffers 140b to 140d.

During the program, read, or erase operation, all or only a portion of the first to fourth planes PL1 to PL4 may be selected by the first to fourth row decoders 130a to 130d and the first to fourth page buffers 140a to 140d. For example, when the first plane PL1 is selected and the remaining second to fourth planes PL2 to PL4 are unselected, one memory block may be selected among the first to j-th memory blocks BLK1 to BLKj that are included in the first plane PL1. At this time, all of the first to j-th memory blocks BLK1 to BLKj that are included in the unselected second to fourth planes PL2 to PL4 may become unselected memory blocks.

For example, when the first and third planes PL1 and PL3 are selected and the remaining second and fourth planes PL2 and PL4 are unselected, one memory block may be selected among the first to j-th memory blocks BLK1 to BLKj that are included in the first plane PL1, and one memory block may be selected among the first to j-th memory blocks BLK1 to BLKj that are included in the third plane PL3. At this time, all of the first to j-th memory blocks BLK1 to BLKj that are included in the unselected second and fourth planes PL2 and PL4 may become unselected memory blocks. When all of the first to fourth planes PL1 to PL4 are selected, one memory block may be selected among the first to j-th memory blocks BLK1 to BLKj that are included in each of the first to fourth planes PL1 to PL4.

Since the memory blocks that are selected from the first to fourth planes PL1 to PL4 are selected by the first to fourth row decoders 130a to 130d, the memory blocks may have different addresses. For example, the first memory block BLK1 may be selected in the first plane PL1, and the fourth memory block BLK4 may be selected in the third plane PL3.

Internal power that is supplied to the memory device may be used to operate the memory blocks that are selected from the first to fourth planes PL1 to PL4. Therefore, as the number of selected memory blocks decreases, a loading speed of a voltage that is transferred to the selected memory blocks may be increased, and thus, stress that is applied to the selected memory blocks may increase. Conversely, as the number of selected memory blocks increases, the loading speed of the voltage that is transferred to the selected memory blocks may be decreased, and thus, the stress that is applied to the selected memory blocks may be less than a case in which the number of selected memory blocks is relatively small. It is assumed that one memory block is selected during the erase operation, and the stress that is applied to the selected memory block by the erase operation is '1'. When the number of selected memory blocks is increased to two during the erase operation, the speed at which the operation voltages are loaded may be decreased compared to a case in which the number of selected memory blocks is one. Therefore, as the number of selected memory blocks increases, the stress due to the erase operation may be lower than '1'.

Figure 4:
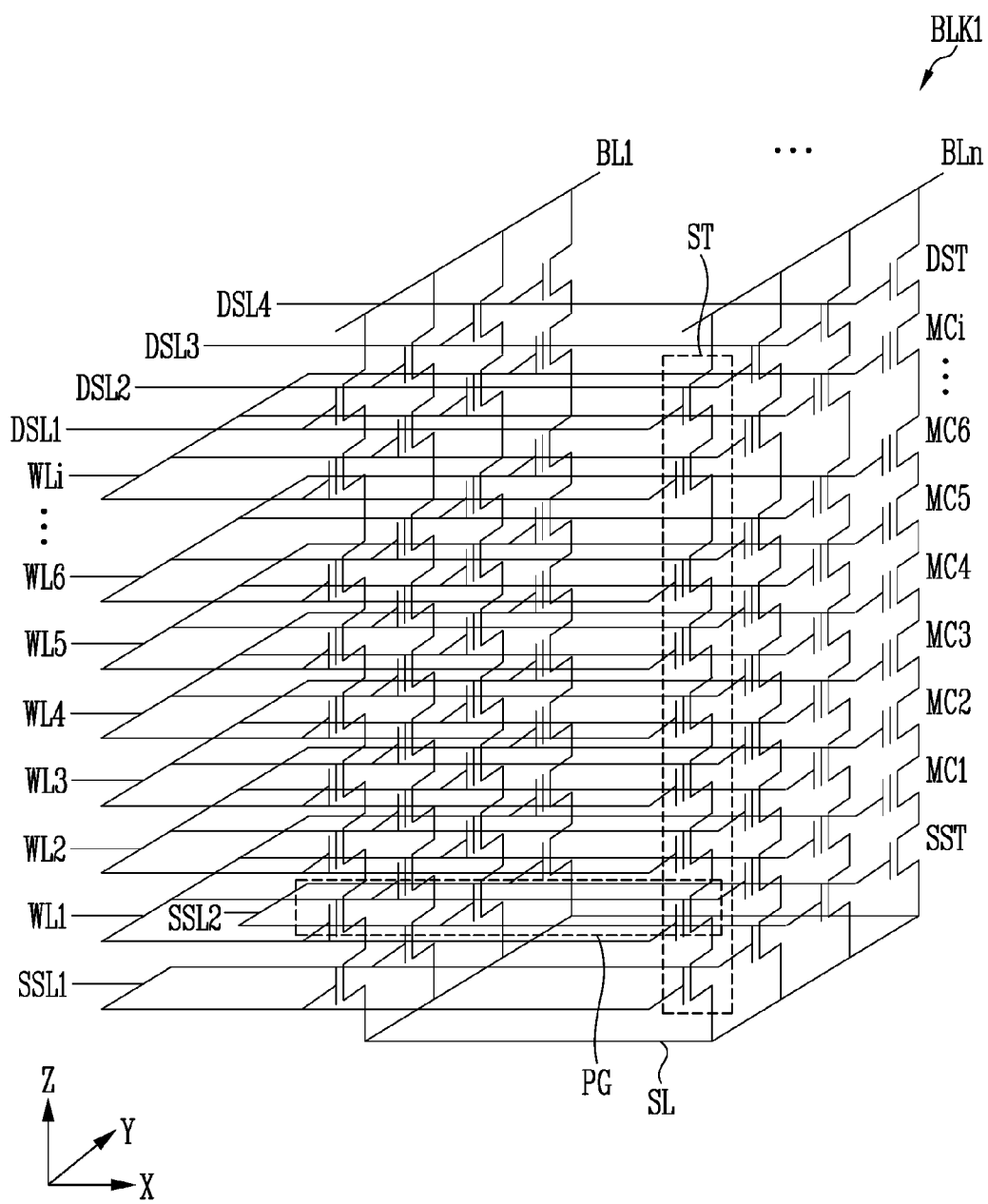
FIG. 4 is a diagram illustrating a memory block.

FIG. 4 is a diagram illustrating the memory block.

Referring to FIG. 4, the first memory block BLK1 includes strings ST connected between first to n-th bit lines BL1 to BLn and a source line SL. Since the first to n-th bit lines BL1 to BLn extend along a Y direction and are spaced apart from each other along an X direction, the strings ST may extend along a Z direction and spaced apart from each other along the X and Y directions.

When any one of the strings ST that is connected to the n-th bit line BLn is described as an example, the string ST may include a source selection transistor SST, first to i-th memory cells MC1 to MCi, and a drain selection transistor DST. The first memory block BLK1, shown in FIG. 4, is a diagram for schematically describing a structure of the memory block, and thus, the number of the source selection transistor SST, the first to i-th memory cells MC1 to MCi, and the drain selection transistor DST that are included in the strings ST may be changed according to the memory device.

Gates of the source selection transistors SST that are included in different strings ST may be connected to a source selection line SSL, gates of the first to i-th memory cells MC1 to MCi may be connected to first to i-th word lines WL1 to WLi, and gates of the drain selection transistors DST may be connected to a drain selection line DSL. The drain selection line DSL, the first to i-th word lines WL1 to WLi, the source selection line SSL, and the source line SL may be included in the local lines LCL of FIG. 2.

Among the first to i-th memory cells MC1 to MCi, memory cells that are formed on the same layer may be connected to the same word line. For example, the first memory cells MC1 that are included in different strings ST may be commonly connected to the first word line WL1, and the i-th memory cells MCi that are included in the different strings ST may be commonly connected to the i-th word line WLi. A group of memory cells, included in different strings ST and connected to the same word line, may become a page PG. The program and read operations may be performed in a unit of pages PG, and the erase operation may be performed in a unit of memory blocks. The erase operation is described as an example as follows.

During the erase operation, an erase allowable voltage may be applied to the first to i-th word lines WL1 to WLi. The erase allowable voltage may be a ground voltage or a 0V voltage. Alternatively, the first to i-th word lines WL1 to WLi may be floated. The erase voltage may be applied to the first to n-th bit lines BL1 to BLn or the source line SL. The erase voltage may be set to a positive voltage to extract electrons that are trapped in the memory cells. A turn-on voltage may be applied to first to fourth drain selection lines DSL1 to DSL4 and first and second source selection lines SSL1 and SSL2. The turn-on voltage may be set to a positive voltage for turning on the drain selection transistors DST and the source selection transistors SST.

Figure 5:
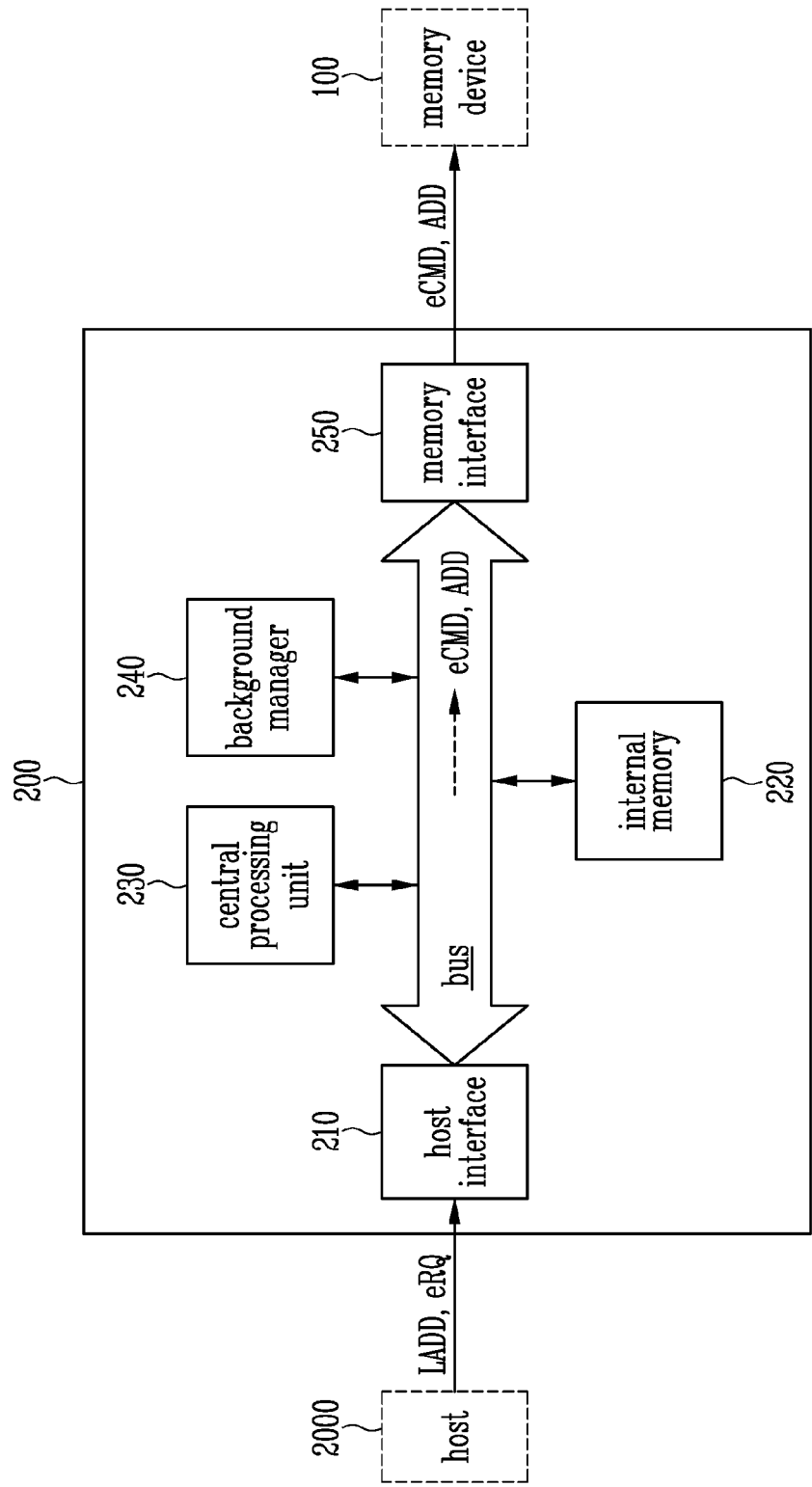
FIG. 5 is a diagram illustrating a controller according to an embodiment of the present disclosure.

FIG. 5 is a diagram illustrating a controller according to an embodiment of the present disclosure.

Referring to FIG. 5, the controller 200 may include a host interface 210, an internal memory 220, a central processing unit 230, a background manager 240, and a memory interface 250, communicating with each other through a bus.

The host interface 210 may communicate between the controller 200 and the host 2000. The host interface 210 may include various interfaces, such as peripheral component interconnect express (PCIe), advanced technology attachment (ATA), serial ATA (SATA), parallel ATA (PATA), serial attached SCSI (SAS), non-volatile memory express (NVMe), universal serial bus (USB), multi-media card (MMC), enhanced small disk interface (ESDI), or integrated drive electronics (IDE). For example, the host interface 210 may receive an erase request eRQ and a logical address LADD from the host 2000 and may transmit the received erase request eRQ and logical address LADD to the bus.

The internal memory 220 may store system data that is used in the controller 200. For example, the internal memory 220 may store an address map table in which the address ADD and the logical address LADD that are used in the memory device 100 are mapped to each other. The address ADD that is used in the memory device 100 may be the physical address. During the program operation, the internal memory 220 may temporarily store data that is received through the host interface 210 and may transmit the data to the memory interface 250. During the read operation, the internal memory 220 may temporarily store data that is received through the memory interface 250 and may transmit the data to the host interface 210. The internal memory 220 may be configured of a volatile memory or a non-volatile memory. For example, the internal memory 220 may be configured of a DRAM, an SRAM, or a NAND memory.

The central processing unit 230 may control the memory device 100 according to the request RQ of the host 2000. For example, the central processing unit 230 may generate an erase command eCMD in response to the erase request eRQ and may select the address ADD that is mapped to the logical address LADD by referring to the address map table that is stored in the internal memory 220. The erase command eCMD and the address ADD may be transmitted to the memory interface 250 through the bus. The central processing unit 230 may perform a background operation in response to a background control signal that is output from the background manager 240. For example, the background manager 240 may output a garbage collection control signal or a wear leveling control signal as the background control signal. The central processing unit 230 may output commands for performing garbage collection in response to the garbage collection control signal and may output commands for performing wear leveling in response to the wear leveling control signal.

The background manager 240 may be configured to monitor background operations that is performed in the memory device 100 and may output the background control signal according to a monitoring result. For example, the background manager 240 may calculate a stress index of the memory blocks that are included in the memory device 100 and may output the garbage collection control signal or the wear leveling control signal according to the stress index.

The stress index of the memory blocks may be calculated according to the number of planes that are selected during the erase operation. For example, the background manager 240 may count the number of planes on which the erase operation is simultaneously performed and may set an offset according to the counted number of planes. The offset may be a numerical value of the stress that is applied to the memory block by the erase operation. For example, since the erase operation is performed on any one of the plurality of memory blocks that are included in the plane, the number of selected memory blocks may be the same as the number of selected planes. Therefore, during the erase operation, when the number of selected planes is one, the number of selected memory blocks may become one, and when the number of selected planes is two, the number of selected memory blocks may become two. As the number of memory blocks on which the erase operation is simultaneously performed increases, since a speed at which the operation voltages are loaded into the selected memory block decreases, the stress of the memory blocks on which the erase operation is performed may decrease. That is, the stress that is applied to the selected memory block may be inversely proportional to the number of selected memory blocks. When the offset is set, the background manager 240 may calculate a conversion value that is a value that is obtained by subtracting the offset from an operation reference value and may update the stress index by adding the conversion value to an accumulated stress index of the selected memory block. When the updated stress index is equal to or greater than a background reference value, the background manager 240 may output the background control signal to perform the background operation.

The memory interface 250 may exchange the command, the address, and the data between the controller 200 and the memory device 100. For example, the memory interface 250 may transmit the erase command eCMD and the address ADD that are received through the bus to the memory device 100.

The memory device 100 may select the plane and the memory block according to the erase command eCMD and the address ADD and may perform the erase operation on the selected memory block that is included in the selected plane.

The controller 200 may further include devices capable of performing various functions in addition to the devices that are shown in FIG. 5. For example, the controller 200 may further include an error correction circuit (not shown).

Figure 6:
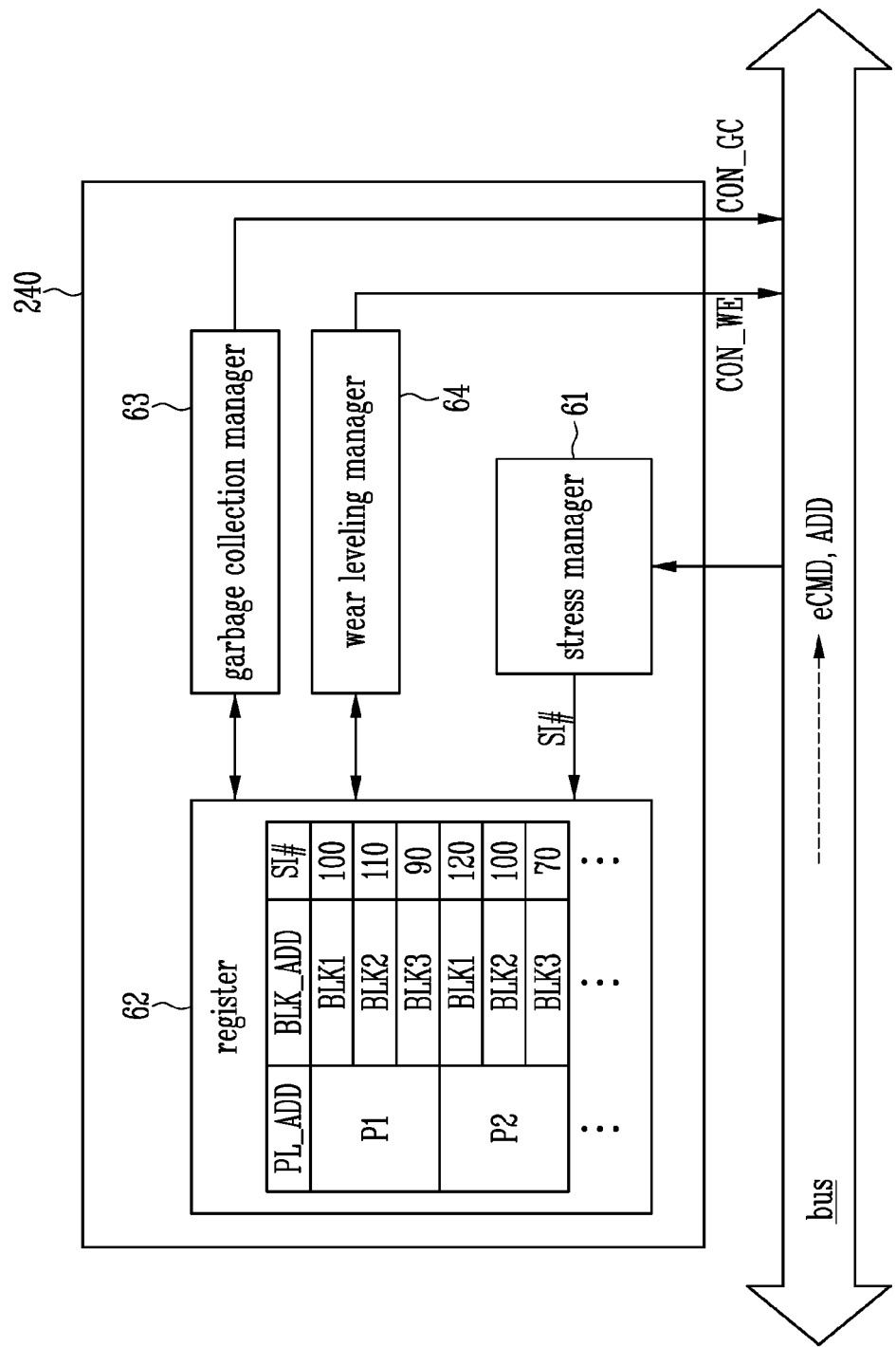
FIG. 6 is a diagram illustrating a background manager according to an embodiment of the present disclosure.

FIG. 6 is a diagram illustrating a background manager according to an embodiment of the present disclosure.

Referring to FIG. 6, the background manager 240 may include a stress manager 61, a register 62, a garbage collection manager 63, and a wear leveling manager 64.

The stress manager 61 may be configured to calculate a stress index SI # according to the address ADD corresponding to the erase command eCMD when the erase command eCMD is loaded into the bus. For example, the stress manager 61 may count the number of planes according to a plane address PL_ADD that is included in the address ADD and may calculate the stress index SI # of the memory block that is selected according to a block address BLK_ADD that is included in the address ADD. A specific operation that is performed in the stress manager 61 will be described later with reference to FIG. 7.

The register 62 may be configured to store the stress index SI # corresponding to each of the memory blocks. The register 62 may be configured of a non-volatile memory to accumulate and update the stress index SI # of each of the memory blocks. For example, the register 62 may store a table including the plane address PL_ADD and the block address BLK_ADD and may store the stress index SI # corresponding to each of the block addresses BLK_ADD.

The garbage collection manager 63 may be configured to monitor the stress index SI # that is stored in the register 62 and may output a garbage collection control signal CON_GC. For example, the garbage collection manager 63 may store a preset garbage collection reference value and may compare the stress index SI # that is stored in the register 62 with the garbage collection reference value. When a stress index SI # that is equal to or greater than the garbage collection reference value is detected, the garbage collection manager 63 may output the garbage collection control signal CON_GC.

The wear leveling manager 64 may be configured to monitor the stress index SI # that is stored in the register 62 and may output a wear leveling control signal CON_WE. For example, the wear leveling manager 64 may store a preset wear leveling reference value and may compare the stress index SI # that is stored in the register 62 with the wear leveling reference value. When a stress index SI # that is equal to or greater than the wear leveling reference value is detected, the wear leveling manager 64 may output the wear leveling control signal CON_WE.

The garbage collection control signal CON_GC or the wear leveling control signal CON_WE may be transmitted to the central processing unit 230 of FIG. 5 through the bus.

Figure 7:
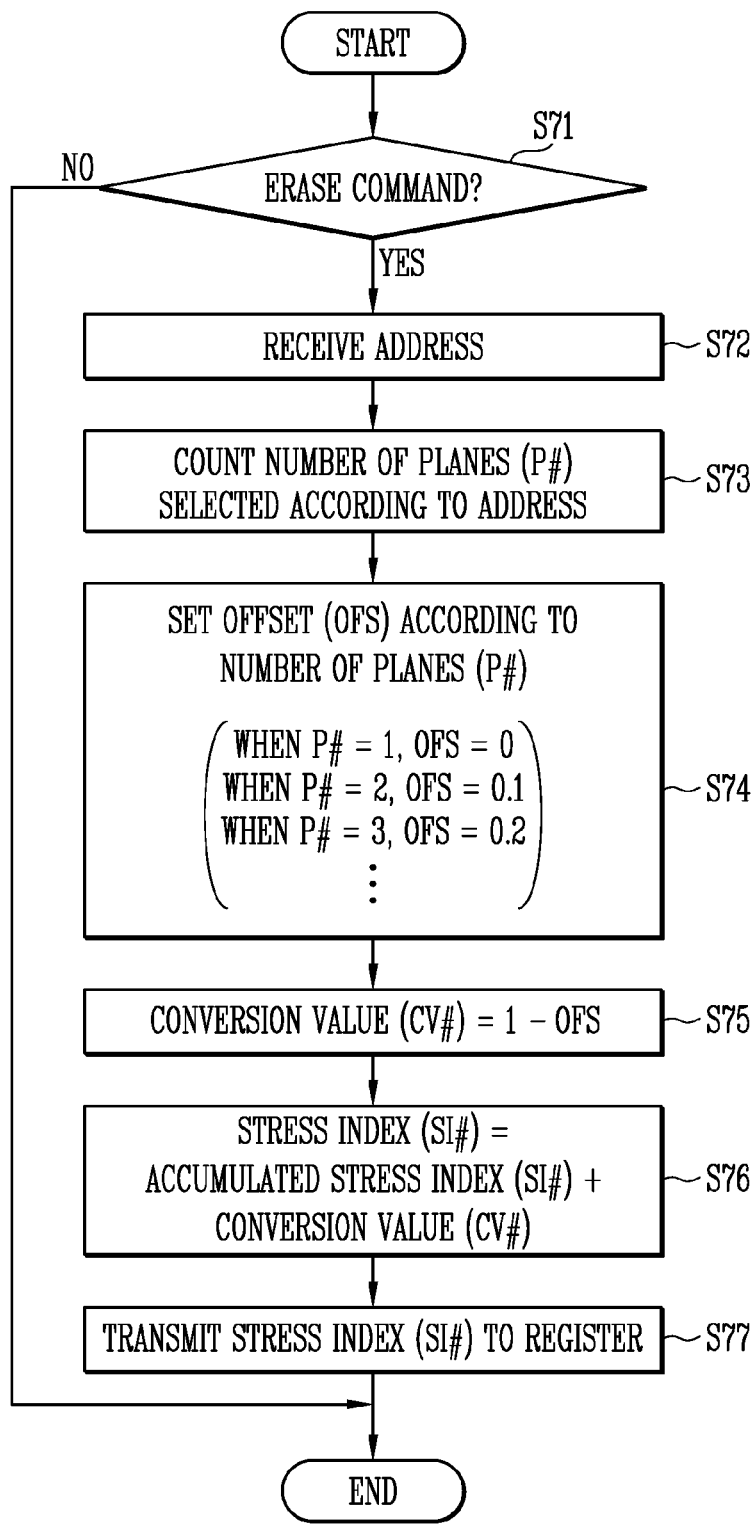
FIG. 7 is a diagram illustrating a method of operating a stress manager.

FIG. 7 is a diagram illustrating a method of operating the stress manager.

Referring to FIGS. 6 and 7, the stress manager 61 may determine whether the erase command eCMD is loaded into the bus (S71). When the command that is loaded into the bus is not the erase command eCMD (No), a stress update operation of the stress manager 61 may be ended. When the command that is loaded into the bus is the erase command eCMD (Yes), the stress manager 61 may receive the address ADD that is loaded into the bus (S72). Here, the address ADD may be the physical address.

The stress manager 61 may count the number of planes P #, which is the number of planes that are selected according to the address ADD (S73). For example, since the address ADD corresponding to the erase command eCMD is the physical address, the plane address PL_ADD and the block address BLK_ADD may be included in the address ADD. The stress manager 61 may count the number of planes P # according to the plane address PL_ADD that is included in the address ADD.

The stress manager 61 may set an offset OFS according to the number of planes P # (S74). For example, when the number of planes P # is 1, the stress manager 61 may set the offset OFS to a minimum value. The minimum value may be 0. When the number of planes P # is 2, the stress manager 61 may set the offset OFS to be higher than that of a case in which the number of planes P # is 1. For example, when the number of planes P # is 2, the stress manager 61 may set the offset OFS to 0.1. When the number of planes P # is 3, the stress manager 61 may set the offset OFS to 0.2. In such a method, the stress manager 61 may increase the offset OFS in proportion to the number of planes P #.

When the offset OFS is set, the stress manager 61 may calculate a conversion value CV # by performing an operation that subtracts the offset OFS from the operation reference value (S75). The operation reference value may be set based on one erase operation in which the stress is maximum. For example, the operation reference value may be set to 1. That is, the conversion value CV # may be a value in which a stress level is reflected in the number of erase operations that are performed on the selected memory block. Therefore, as the offset OFS increases, the conversion value CV # may decrease. For example, when the offset OFS is 0, the conversion value CV # may become 1, and when the offset OFS is 0.1, the conversion value CV # may become 0.9.

When the conversion value CV # is calculated, the stress manager 61 may calculate a new stress index SI # by adding the conversion value CV # to the accumulated stress index SI # of the selected memory block (S76).

When the stress index SI # corresponding to the selected memory block is calculated, the stress manager 61 may transmit the newly calculated stress index SI # to the register 62 (S77). Accordingly, the stress index SI # of the memory block that is selected in the register 62 may be updated.

Figure 8:
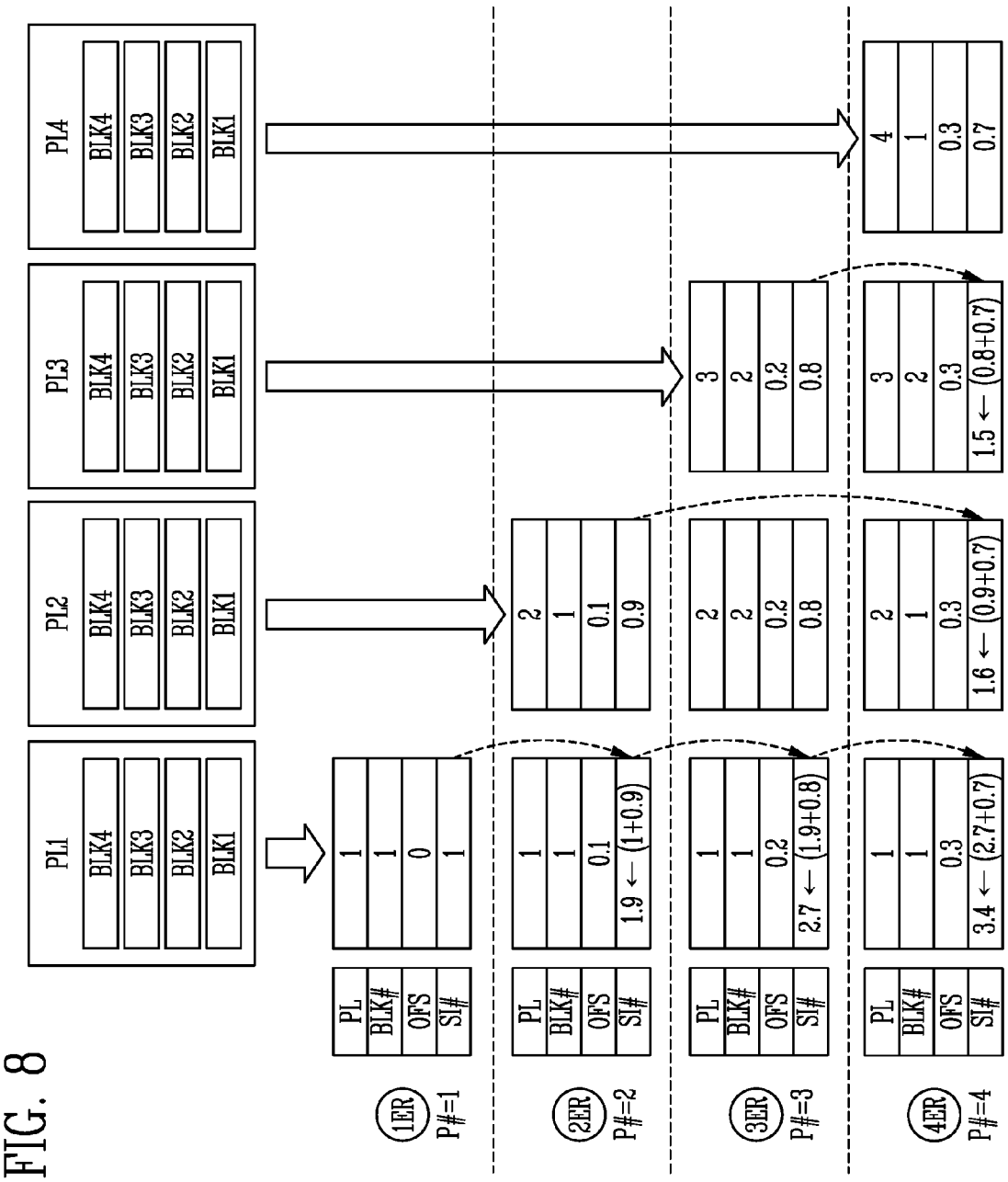
FIG. 8 is a diagram illustrating a stress index of memory blocks according to an erase operation.

FIG. 8 is a diagram illustrating the stress index of the memory blocks according to the erase operation.

Referring to FIGS. 7 and 8, the first to fourth planes PL1 to PL4, each including the first to fourth memory blocks BLK1 to BLK4, are shown as examples.

It is assumed that a first erase operation 1ER is performed on the first memory block BLK1 of the first plane PL1 and the remaining second to fourth planes PL2 to PL4 are unselected. Since the first plane PL1 is selected and the second to fourth planes PL2 to PL4 are unselected, the number of planes P # may become 1. Since the number of planes P # is 1, the offset OFS may become 0 according to step S74. When the offset OFS is 0, the conversion value CV # becomes 1. When the erase operation is first performed on the first memory block BLK1 of the first plane PL1, since the accumulated stress index SI # does not exist or is 0, the stress index SI # may be calculated as 1, which is the conversion value CV #.

After the first erase operation 1ER is completed in the first memory block BLK1 of the first plane PL1, various operations, for example, the program or read operation may be performed on the first to fourth planes PL1 to PL4. Next, a case in which a second erase operation 2ER, in which a plurality of planes are selected, is performed is described as follows.

It is assumed that the second erase operation 2ER may be simultaneously performed on the first memory block BLK1 of the first plane PL1 and the first memory block BLK1 of the second plane PL2, while the remaining third and fourth planes PL3 and PL4 might not be selected. Since the number of planes P # of the planes that are selected in the second erase operation 2ER is 2, the offset OFS may become 0.1 according to step S74. When the offset OFS is 0.1, the conversion value CV # may become 0.9. Since the accumulated stress index SI # of the first memory block BLK1 of the first plane PL1 is 1, which is calculated in the first erase operation 1ER, 0.9, which is the conversion value CV #, may be added to 1, which is the accumulated stress index SI #, in the second erase operation 2ER, and thus, the new stress index SI # may become 1.9. When the erase operation is first performed on the first memory block BLK1 of the second plane PL2, since the accumulated stress index SI # does not exist or is 0, the stress index SI # corresponding to the first memory block BLK1 of the second plane PL2 may be calculated as 0.9, which is the conversion value CV #.

After the second erase operation 2ER is completed, a third erase operation 3ER may be performed. It is assumed that the third erase operation 3ER may be simultaneously performed on the first memory block BLK1 of the first plane PL1, the second memory block BLK2 of the second plane PL2, and the second memory block BLK2 of the third plane PL3, while the remaining fourth plane PL4 might not be selected. Since the number of planes P # of the planes that are selected in the third erase operation 3ER is 3, the offset OFS may become 0.2 according to step S74. When the offset OFS is 0.2, the conversion value CV # may become 0.8. Since the accumulated stress index SI # of the first memory block BLK1 of the first plane PL1 is 1.9, which is calculated in the second erase operation 2ER, 0.8, which is the conversion value CV #, may be added to 1.9, which is the accumulated stress index SI #, in the third erase operation 3ER, and thus, the new stress index SI # may become 2.7. When the erase operation is first performed on the second memory block BLK2 of the second plane PL2, since the accumulated stress index SI # does not exist or is 0, the stress index SI # corresponding to the second memory block BLK2 of the second plane PL2 may be calculated as 0.8, which is the conversion value CV #. When the erase operation is first performed on the second memory block BLK2 of the third plane PL3, since the accumulated stress index SI # does not exist or is 0, the stress index SI # corresponding to the second memory block BLK2 of the third plane PL3 may be calculated as 0.8, which is the conversion value CV #.

After the third erase operation 3ER is completed, a fourth erase operation 4ER may be performed. It is assumed that the fourth erase operation 4ER is simultaneously performed on the first memory block BLK1 of the first plane PL1, the first memory block BLK1 of the second plane PL2, the second memory block BLK2 of the third plane PL3, and the first memory block BLK1 of the fourth plane PL4. Since the number of planes P # of the planes that are selected in the fourth erase operation 4ER is 4, the offset OFS may become 0.3 according to step S74. When the offset OFS is 0.3, the conversion value CV # may become 0.7. Since the accumulated stress index SI # of the first memory block BLK1 of the first plane PL1 is 2.7, which is calculated in the third erase operation 3ER, 0.7, which is the conversion value CV #, may be added to 2.7, which is the accumulated stress index SI #, in the fourth erase operation 4ER, and thus, the new stress index SI # may become 3.4. Since the accumulated stress index SI # of the first memory block BLK1 of the second plane PL2 is 0.9, which is calculated in the second erase operation 2ER, 0.7, which is conversion value CV #, may be added to 0.9, which is the accumulated stress index SI #, in the fourth erase operation 4ER, and thus, the new stress index SI # may become 1.6. Since the accumulated stress index SI # of the second memory block BLK2 of the third plane PL3 is 0.8, which is calculated in the third erase operation 3ER, 0.7, which is conversion value CV #, may be added to 0.8, which is the accumulated stress index SI #, in the fourth erase operation 4ER, and thus, the new stress index SI # may become 1.5. When the erase operation is first performed on the first memory block BLK1 of the fourth plane PL4, since the accumulated stress index SI # does not exist or is 0, the stress index SI # corresponding to the first memory block BLK1 of the fourth plane PL4 may be calculated as 0.7, which is the conversion value CV #.

As described above, as the number of planes simultaneously selected during the erase operation decreases, the increase in value of the stress index SI # may increase, and as the number of simultaneously selected planes increases, the increase in value of the stress index SI # may decrease. That is, even though the erase operations are performed on the same memory block that is included in the same plane, the increase in value of the stress index SI # may vary according to the number of planes that are simultaneously selected when the erase operations are performed.

Figure 9:
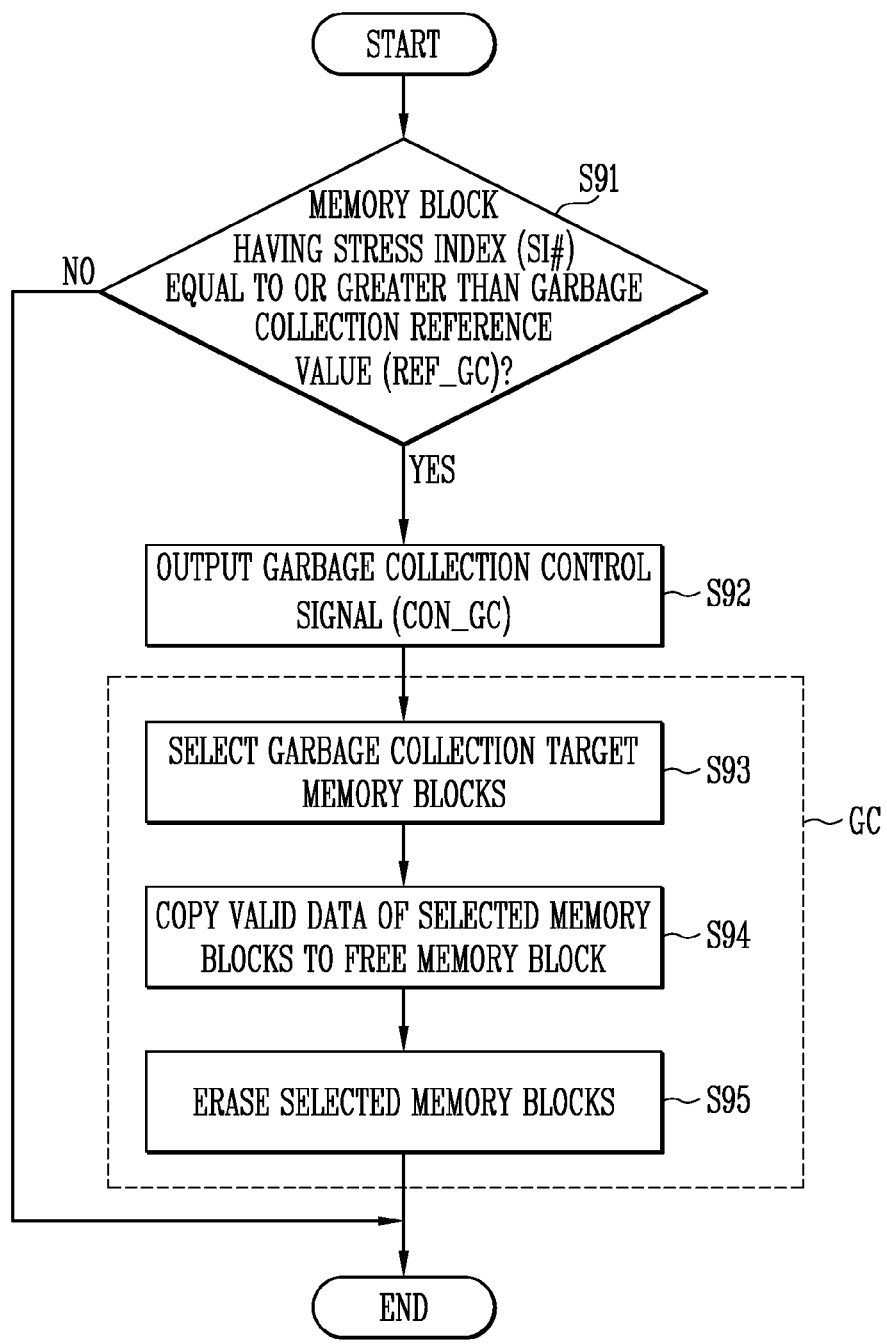
FIG. 9 is a diagram illustrating garbage collection according to an embodiment of the present disclosure.

FIG. 9 is a diagram illustrating garbage collection according to an embodiment of the present disclosure.

Referring to FIGS. 6 and 9, the garbage collection manager 63 may compare a garbage collection reference value REF_GC to the stress index SI # of each of the memory blocks whenever the stress index SI # is updated in the register 62 (S91). In step S91, when a memory block having a stress index SI # that is equal to or greater than the garbage collection reference value REF_GC is not detected (No), garbage collection GC might not be performed. In step S91, when the memory block having the stress index SI # that is equal to or greater than the garbage collection reference value REF_GC is detected (Yes), the garbage collection manager 63 may output the garbage collection control signal CON_GC (S92). The garbage collection reference value REF_GC may be set to a constant value regardless of the memory block. That is, since the conversion value CV # is reflected in the stress index SI # corresponding to the memory blocks, the garbage collection reference value REF_GC having the constant value may be used.

When the garbage collection control signal CON_GC is transmitted to the central processing unit 230, the central processing unit 230 may perform the garbage collection GC. For example, the central processing unit 230 may select garbage collection target memory blocks (S93). The garbage collection target memory blocks may be selected according to an amount of valid data. For example, among data that is stored in the memory blocks, memory blocks in which the amount of valid data is less than a reference amount may be selected.

The central processing unit 230 may control the memory device 100 to copy the valid data that is stored in the memory blocks, selected in step S93, to a free memory block (S94). Subsequently, the central processing unit 230 may control the memory device 100 to erase the selected memory blocks (S95). Since the memory blocks that are erased in step S95 become the free memory blocks on which the program operation may be performed, the number of free memory blocks that are included in the memory device 100 may increase.

Figure 10:
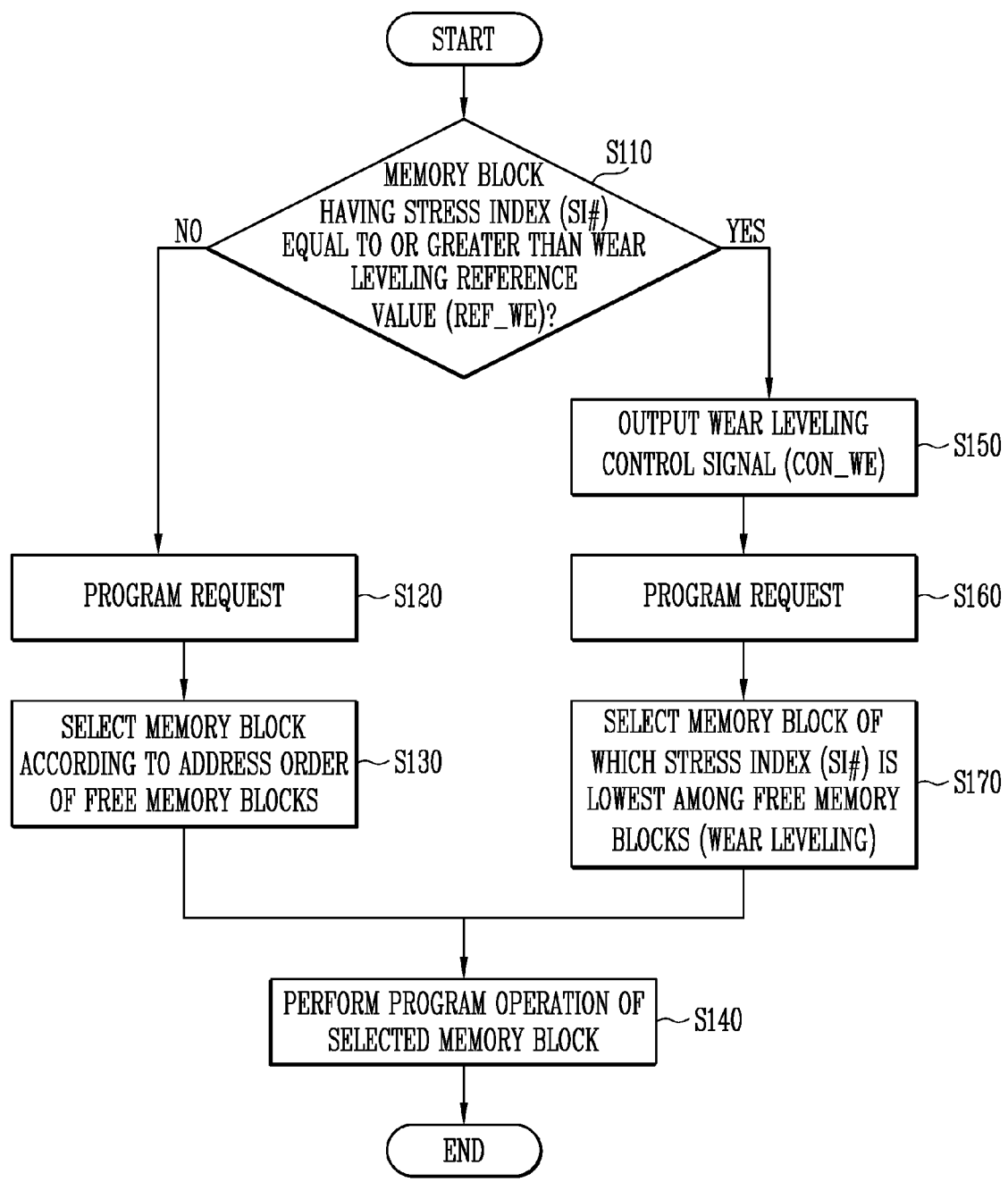
FIG. 10 is a diagram illustrating wear leveling according to an embodiment of the present disclosure.

FIG. 10 is a diagram illustrating wear leveling according to an embodiment of the present disclosure.

Referring to FIGS. 6 and 10, the wear leveling manager 64 may compare a wear leveling reference value REF_WE to the stress index SI # of each of the memory blocks whenever the stress index SI # is updated in the register 62 S110. In step S110, when a memory block having a stress index SI # that is equal to or greater than the wear leveling reference value REF_WE is not detected (No), wear leveling might not be performed. Therefore, when the program request is input to the central processing unit 230 (S120), the central processing unit 230 may select the memory block according to an address order of the free memory blocks (S130). Subsequently, the central processing unit 230 may control the memory device 100 to perform the program operation on the memory block that is selected in step S130 (S140).

In step S110, when the memory block having the stress index SI # that is equal to or greater than the wear leveling reference value REF_WE is detected (Yes), the wear leveling manager 64 may output the wear leveling control signal CON_WE (S150). The wear leveling reference value REF_WE may be set to a constant value regardless of the memory block. That is, since the conversion value CV # is reflected in the stress index SI # corresponding to the memory blocks, the wear leveling reference value REF_WE having the constant value may be used. The wear leveling control signal CON_WE that is output from the wear leveling manager 64 may be input to the central processing unit 230.

When the program request is input to the central processing unit 230, to which the wear leveling control signal CON_WE is input (S160), the central processing unit 230 may select a memory block of which the stress index SI # is lowest among the free memory blocks (S170). Subsequently, the central processing unit 230 may control the memory device 100 to perform the program operation on the memory block that is selected in step S170 (S140).

As described above, the wear leveling may be performed after the memory block having the stress index SI # that is equal to or greater than the wear leveling reference value REF_WE is detected, a memory block of which the stress index SI # is low may be preferentially selected during the program operation.

Figure 11:
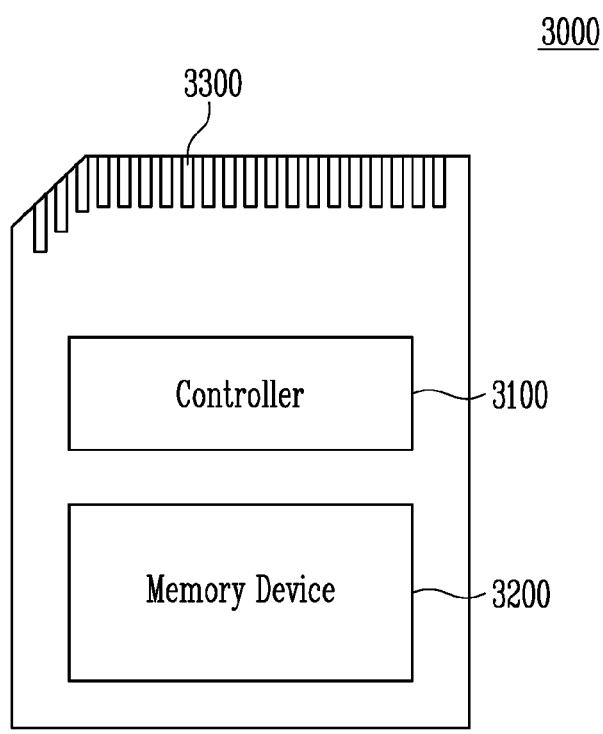
FIG. 11 is a diagram illustrating a memory card system to which a memory device according to an embodiment of the present disclosure is applied.

FIG. 11 is a diagram illustrating a memory card system to which a memory device according to an embodiment of the present disclosure is applied.

Referring to FIG. 11, the memory card system 3000 may include a controller 3100, a memory device 3200, and a connector 3300.

The controller 3100 may be connected to the memory device 3200. The controller 3100 may be configured to access the memory device 3200. For example, the controller 3100 may be configured to control a program, read, or erase operation on the memory device 3200 or to control a background operation. The controller 3100 may include the configurations of the controller 200, shown in FIG. 5. The controller 3100 may be configured to provide an interface between the memory device 3200 and a host. The controller 3100 may be configured to drive firmware for controlling the memory device 3200. For example, the controller 3100 may include components, such as a random access memory (RAM), a processing unit, a host interface, a memory interface, and an error correction circuit.

The controller 3100 may communicate with an external device through the connector 3300. The controller 3100 may communicate with an external device (for example, the host) according to a specific communication standard. For example, the controller 3100 may be configured to communicate with an external device through at least one of various communication standards, such as a universal serial bus (USB), a multimedia card (MMC), an embedded MMC (eMMC), a peripheral component interconnection (PCI), a PCI express (PCI-E), an advanced technology attachment (ATA), a serial-ATA, a parallel-ATA, a small computer system interface (SCSI), an enhanced small disk interface (ESDI), integrated drive electronics (IDE), FireWire, a universal flash storage (UFS), Wi-Fi, Bluetooth, and an NVMe. For example, the connector 3300 may be defined by at least one of the various communication standards described above.

The memory device 3200 may include memory cells and may be configured identically to the memory device 100 shown in FIG. 2.

The controller 3100 and the memory device 3200 may be integrated into one semiconductor device to configure a memory card. For example, the controller 3100 and the memory device 3200 may be integrated into one semiconductor device to configure a memory card, such as a PC memory card (personal computer memory card (PCMCIA)), a compact flash card (CF), a smart media card (SM or SMC), a memory stick, a multimedia card (MMC, RS-MMC, MMCmicro, or eMMC), an SD card (SD, miniSD, microSD, or SDHC), and a universal flash storage (UFS).

Figure 12:
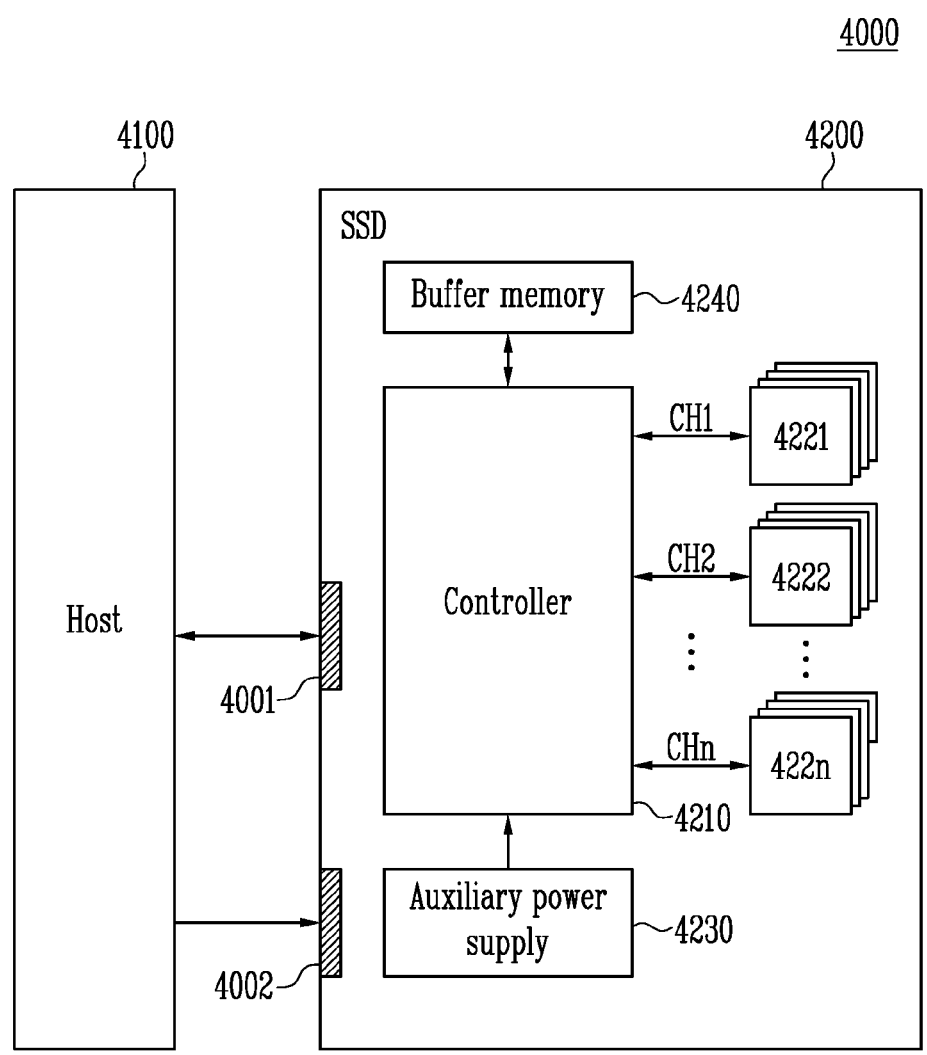
FIG. 12 is a diagram illustrating a solid state drive (SSD) system to which a memory device according to an embodiment of the present disclosure is applied.

FIG. 12 is a diagram illustrating a solid state drive (SSD) system to which a memory device according to an embodiment of the present disclosure is applied.

Referring to FIG. 12, the SSD system 4000 may include a host 4100 and an SSD 4200. The SSD 4200 may exchange a signal with the host 4100 through a signal connector 4001 and may receive power through a power connector 4002. The SSD 4200 may include a controller 4210, a plurality of memory devices 4221 to 422n, an auxiliary power supply 4230, and a buffer memory 4240.

The controller 4210 may control the plurality of memory devices 4221 to 422n in response to the signal that is received from the host 4100. For example, the signal may be signals based on an interface between the host 4100 and the SSD 4200. For example, the signal may be a signal that is defined by at least one of the following interfaces: a universal serial bus (USB), a multimedia card (MMC), an embedded MMC (eMMC), a peripheral component interconnection (PCI), a PCI express (PCI-E), an advanced technology attachment (ATA), a serial-ATA, a parallel-ATA, a small computer system interface (SCSI), an enhanced small disk interface (ESDI), integrated drive electronics (IDE), FireWire, a universal flash storage (UFS), Wi-Fi, Bluetooth, and an NVMe. The controller 4210 may include the configurations of the controller 200, shown in FIG. 5.

The plurality of memory devices 4221 to 422n may include memory cells capable of storing data. Each of the plurality of memory devices 4221 to 422n may be configured identically to the memory device 100 shown in FIG. 2.

The auxiliary power supply 4230 may be connected to the host 4100 through the power connector 4002. The auxiliary power supply 4230 may receive a power voltage from the host 4100 and charge the power voltage. The auxiliary power supply 4230 may provide a power voltage of the SSD 4200 when power supply from the host 4100 is not smooth. For example, the auxiliary power supply 4230 may be positioned in the SSD 4200 or may be positioned outside of the SSD 4200. For example, the auxiliary power supply 4230 may be positioned on a main board and may provide auxiliary power to the SSD 4200.

The buffer memory 4240 may operate as a buffer memory of the SSD 4200. For example, the buffer memory 4240 may temporarily store data that is received from the host 4100 or data that is received from the plurality of memory devices 4221 to 422n or may temporarily store data (for example, a mapping table) of the memory devices 4221 to 422n. The buffer memory 4240 may include a volatile memory, such as a DRAM, an SDRAM, a DDR SDRAM, and an LPDDR SDRAM, or a non-volatile memory such as an FRAM, a ReRAM, an STT-MRAM, and a PRAM.

What is claimed is:

1. A controller configured to:
   generate a conversion value according to a number of selected planes during an erase operation and configured to calculate a stress index of a memory block based on the conversion value;
   store, in a register, the stress index corresponding to the memory block; and
   output a garbage collection signal based on comparing the stress index to a garbage collection reference value;
   perform a garbage collection operation based on the garbage collection control signal.

2. The controller of claim 1, wherein the controller is configured to receive an address corresponding to an erase command and configured to count the number of selected planes according to a plane address that is included in the address.

3. The controller of claim 2, wherein the controller is configured to set an offset according to the number of the selected planes.

4. The controller of claim 3, wherein the controller is configured to increase a value of the offset as the number of the selected planes increases.

5. The controller of claim 3, wherein the controller is configured to generate the conversion value by performing an operation that subtracts, when the offset is set, the offset from an operation reference value.

6. The controller of claim 5, wherein the controller is configured to calculate the stress index by performing an operation that adds the conversion value to an accumulated stress index of the memory block that is referenced by the address.

7. The controller of claim 1, wherein the controller is configured to update the stress index that is stored in the register whenever the stress index is calculated.

8. The controller of claim 1, wherein the controller is configured to store a plane address corresponding to each of the selected planes, a block address corresponding to the memory block that is included in one of the selected planes, and the stress index corresponding to the block address.

9. The controller of claim 1, wherein the controller is a non-volatile memory.

10. The controller of claim 1, wherein the controller is configured to compare the stress index to the garbage collection reference value when the stress index, which is stored in the register is updated.

11. The controller of claim 1, wherein the garbage collection reference value is set to a fixed value.

12. The controller of claim 1, wherein the controller is configured to output the garbage collection control signal when it is determined that the stress index is equal to or greater than the garbage collection reference value.

13. The controller of claim 1,
wherein the controller is configured to output a wear leveling control signal by comparing the stress index to a wear leveling reference value.

14. The controller of claim 13, wherein the controller is configured to compare the stress index to the wear leveling reference value when the stress index, which is stored in the register is updated.

15. The controller of claim 13, wherein the wear leveling reference value is set to a fixed value.

16. The controller of claim 13, wherein the controller is configured to output the wear leveling control signal when it is determined that the stress index is equal to or greater than the wear leveling reference value.

17. A controller configured to:
generate an erase command in response to an erase request that is received from a host;
store a logical address, in an internal memory, that is received from the host and a physical address that is mapped to the logical address; and
calculate a stress index of a memory block on which an erase operation is performed according to a plane address that is included in the physical address and configured to output a background control signal that activates a background mode according to the stress index;
perform a garbage collection operation when the background mode is activated.

18. The controller of claim 17, wherein the controller is configured to count a number of planes according to the plane address.

19. The controller of claim 18, wherein the controller is configured to set an offset according to the number of planes.

20. The controller of claim 19, wherein the offset is set to increase as the number of planes increases.

21. The controller of claim 19, wherein the controller is configured to generate a conversion value by performing an operation that subtracts the offset from an operation reference value.

22. The controller of claim 21, wherein the operation reference value is set to 1.

23. The controller of claim 21, wherein the controller is configured to calculate the stress index by performing an operation that adds the conversion value to an accumulated stress index of the memory block.

24. The controller of claim 21, wherein the controller is configured to compare a background reference value to the stress index and configured to output the background control signal when the stress index is equal to or greater than the background reference value.

25. A method of operating a controller, the method comprising:
counting a number of planes of selected planes during an erase operation;
setting an offset according to the number of planes;
generating a conversion value by performing an operation that subtracts the offset from an operation reference value;
calculating a stress index of a selected memory block by adding the conversion value to an accumulated stress index of the selected memory block, among memory blocks that are included in each of the selected planes;
comparing the stress index with a background reference value; and
activating a background mode in response to determining that the stress index is equal to or greater than the background reference value, wherein garbage collection or wear leveling is performed when the background mode is activated.

26. The method of claim 25, wherein the counting the number of planes comprises:
generating an erase command for the erase operation;
extracting, from an address corresponding to the erase command, a plane address of the selected planes; and
counting the number of planes according to the plane address.

27. The method of claim 26, wherein, in setting the offset, the offset is set to increase as the number of planes increases.

28. The method of claim 25, wherein the operation reference value is set to 1.

29. The method of claim 25, wherein, in response to calculating the stress index of the selected memory block, the accumulated stress index of the selected memory block is updated with the newly calculated stress index.

* * * * *